(No Model.) 2 Sheets—Sheet 2.

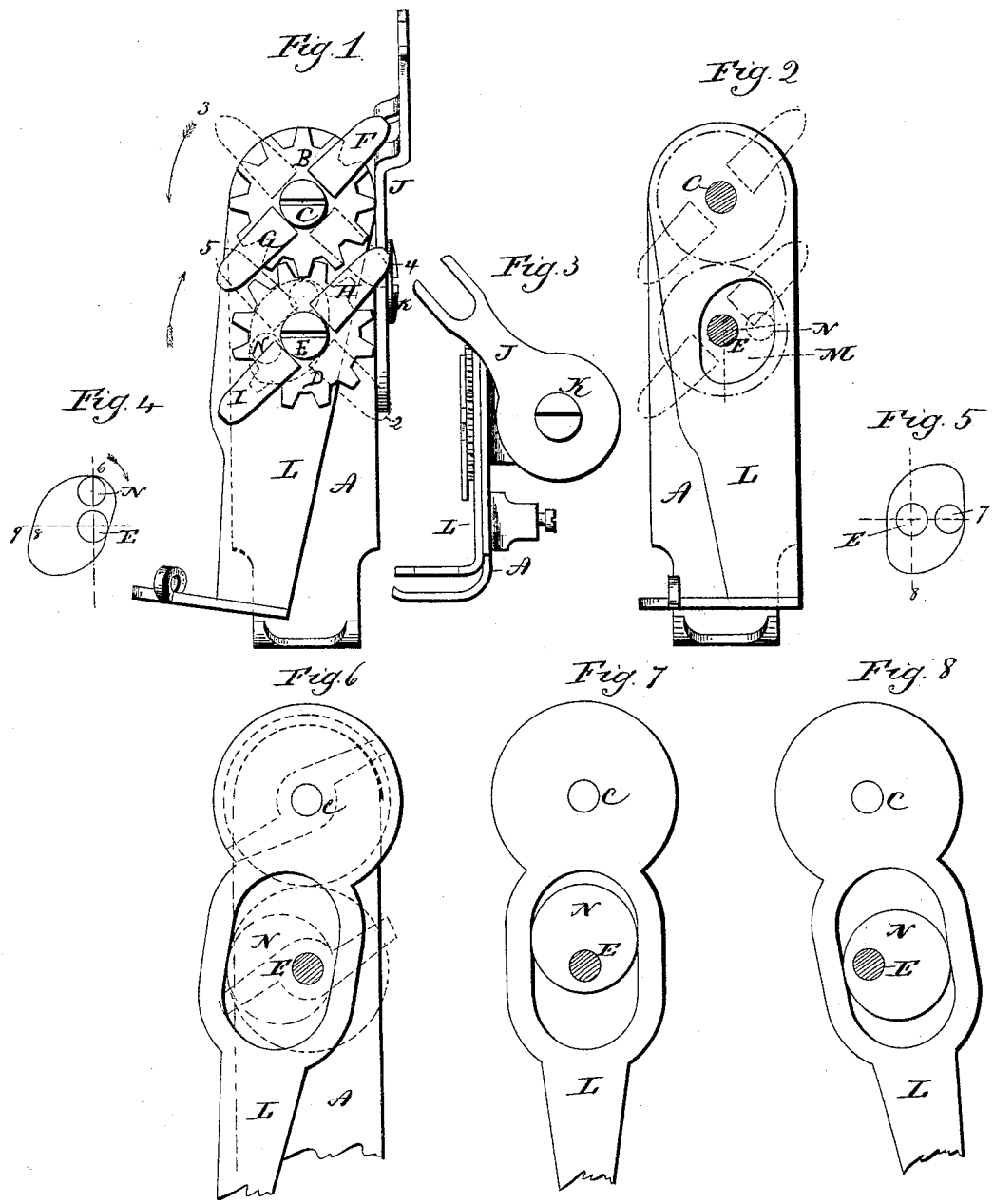

A. W. JOHNSON.
MECHANICAL MOVEMENT.

No. 384,258. Patented June 12, 1888.

UNITED STATES PATENT OFFICE.

ALBERT W. JOHNSON, OF NEW HAVEN, CONNECTICUT, ASSIGNOR TO THE PEERLESS BUTTON HOLE ATTACHMENT COMPANY, OF CONNECTICUT.

MECHANICAL MOVEMENT.

SPECIFICATION forming part of Letters Patent No. 384,258, dated June 12, 1888.

Application filed December 20, 1887. Serial No. 258,484. (No model.)

*To all whom it may concern:*

Be it known that I, ALBERT W. JOHNSON, of New Haven, in the county of New Haven and State of Connecticut, have invented a new Improvement in Mechanical Movements; and I do hereby declare the following, when taken in connection with accompanying drawings and the letters of reference marked thereon, to be a full, clear, and exact description of the same, and which said drawings constitute part of this specification, and represent, in—

Figure 9:
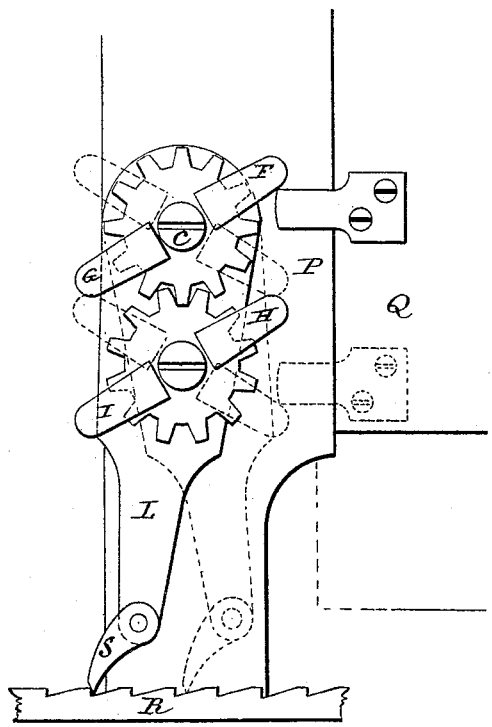
Figure 10:
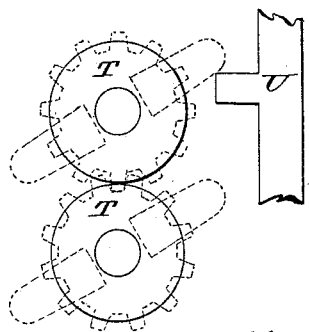

Figure 1 a front view of an embroidery attachment for sewing-machines, illustrating the invention as applied thereto, and showing the arm in one extreme of its vibration; Fig. 2, the same as Fig. 1, showing the arm at the other extreme of vibration, the gears being indicated in broken lines; Fig. 3, a side view, reduced scale; Figs. 4 and 5, diagrams illustrating the eccentric or cam-connection between the active wheel and the arm; Figs. 6, 7, and 8, modifications in the eccentric connection between the active wheel and the arm. Fig. 9 represents the application of the invention as a pawl-and-ratchet feed; Fig. 10 represents the application of the invention to an intermittent rotary feed.

This invention relates to a mechanism having for its object to convert reciprocating movement into an intermittent rotary motion; and the invention consists in a pair of gear-wheels working together upon axes parallel to each other, each of said wheels provided with arms or projections, between which a reciprocating device operates, so as to engage the said arm or projection on the one wheel as it moves in one direction, and then engage the arm of the other wheel as the said device moves in the opposite direction, and whereby such reciprocating movement is communicated first to one wheel, then to the other wheel, imparting intermittent rotation always in the same direction, as more fully hereinafter described.

The invention is applicable to various purposes, but for convenience of illustration I show it as applied for a sewing-machine attachment to facilitate the work commonly called "embroidery"—that is to say, a device for carrying a cord or braid upon the surface of work and laying it in an irregular path with relation to the line of stitches which are run through the cloth and braid so as to secure the braid on the cloth in a circuitous line.

A represents the frame or base, which in this case is the device by which the mechanism is attached to the sewing-machine. On this frame a gear-wheel, B, is arranged upon an axis, C, at right angles to the plane of the frame.

D represents a second gear-wheel, like the gear-wheel B, and of the same diameter and teeth. It is arranged upon an axis, E, in the frame parallel with the axis C, and so that the two wheels may work together, as represented in Fig. 1, that the rotation imparted to one may be communicated to the other.

The wheel B is provided with a radially-projecting arm, F, and with a second like radially-projecting arm, G, the two arms being diametrically opposite each other. The wheel D is provided with arms H and I diametrically opposite each other, similar to the arms F G of the wheel B. Preferably the arms project beyond the working-face of the wheels, but must always be so that the reciprocating device can work between them, so that as it moves in one direction it will strike one arm and impart rotation to that wheel, and then moving in the opposite direction the arm of the other wheel will be presented for action, and so as to impart a like rotation to the said other wheel, and whereby the rotation of the wheels under both steps is in the same direction.

The reciprocating mechanism in this case is the sewing-machine needle-bar through a lever, J, hung in the frame upon a pivot, K, in the usual manner for the operating-arm of sewing-machine attachments, and so that the free end of the arm partakes of the reciprocating movement of the needle-bar in the usual manner. The needle-bar is not represented.

The lever J extends to a point in front of the plane of the wheels, and so as to work in the path of the respective arms F G H I as they rotate.

As the lever J stands in the up position the arm F of the wheel B is supposed to have been turned up with it, as represented in Fig. 1. Starting now from this position, the lever J descends, and in its descent meets the arm H in its path and turns that arm downward to the position 2, (indicated in broken lines, Fig. 1,) which imparts a corresponding rotation to its wheel D, and a corresponding reverse rotation to the wheel B, which carries the arm F to the position 3, (indicated in broken lines, Fig. 1,) which brings the arm G to the position 4. At the same time the arm I of the wheel D has been carried to the position 5, (also seen in broken lines.) This will leave the arm G at the position 4 above the lever J, and so that as the lever J next ascends it will strike the arm G at the position 4, and will cause that arm to rise to the position indicated by the arm F, Fig. 1, which will impart a corresponding rotation to the wheel B, and thence to the wheel D, and bring the arm I to the position represented as occupied by the arm H in Fig. 1, leaving that arm I then in the path of the lever J on its next descent. Thus as the reciprocating movement is produced downward it acts through the one wheel D, and on the return movement it acts upon the wheel B, alternately acting upon the respective wheels, but imparting an intermittent rotation to both wheels—one step as the reciprocating device moves in one direction and the second step as the said device moves in the opposite direction. Thus from the reciprocating movement an intermittent rotation is imparted to the said two wheels—first through one wheel as the reciprocating device moves in one direction and then through the other wheel as the reciprocating device moves in the opposite direction.

L represents an arm, which is hung to the frame A, and so as to swing in a plane parallel with the plane of the wheels B D. As here represented the arm is hung upon the axis of the wheel B, and the arm is constructed with an opening, M, through which the axis E of the wheel D extends, so that the wheel stands upon the outer face of the arm L, as represented in Figs. 1 and 3.

Into the opening M a stud, N, on the wheel works as a cam. The shape of the opening M is such that the stud N working therein imparts a swinging or vibratory movement to the arm L, as from the position Fig. 1 to that in Fig. 2, and return.

The operation of the stud N on the cam-shaped opening M in the arm L is represented in Figs. 4 and 5. 6 represents the position of the stud on the wheel, and E the axis of the wheel. The position of the lever being at the left, as seen in Fig. 1, as the stud N moves under rotation from the position in Fig. 4 to the position 7, Fig. 5, the shape of the opening in the arm is such that the stud forces the arm to the opposite position represented in Fig. 2. From the position 7 through one-fourth rotation to the position 8 the shape of the opening is concentric with the axis E, as seen in Fig. 5. From the position 8 through the third quarter to the point 9 the shape is eccentric to the axis; consequently the stud, acting against that portion of the opening, returns the arm to the position seen in Fig. 1, the position 9 being indicated in Fig. 4; then through the fourth quarter, as from the position 9 to the position 6, Fig. 4, the surface of the opening is concentric with the axis E; hence the arm receives its vibratory movement in one direction, as from the position 6 to position 7; then the arm will remain stationary from position 7 to position 8, or during the second portion of the rotation; then under the third portion of rotation, as from the position 8 to position 9, the arm will be returned, and then remain stationary through the fourth or last portion of the rotation, as from the position 9 to position 6. Thus I illustrate the application of the intermittent rotary motion as a means for producing intermittent vibratory motion.

Instead of the cam-shaped opening as the means of communicating the rotary movement of the wheels to the arm the sides of the opening may be parallel, as represented in Figs. 6, 7, and 8, and instead of a stud to work against the side of the opening at one point only, as first described, the stud may be enlarged in the form of an eccentric, as represented in said figures, and so that the rotation of the wheel and the eccentric will operate through the opening in the lever and throw it from one extreme to the other, as from Fig. 6 to Fig. 8 and return, the central position being vertical, as indicated in Fig. 7; but under this arrangement there will be no positive rest to the arm or vibrating part, as in the first illustration—that is to say, in the first illustration the vibratory movement is imparted by the movement of the reciprocating device in one direction only. When moving in the opposite direction the vibrating arm remains stationary, whereas in the last illustration the vibrating movement in one direction is produced by one half the rotation, and in the opposite direction by the other half.

To illustrate the application of this invention to another purpose, I represent in Fig. 9 its application as a feed for a punching-machine, in which P represents one of the uprights between which the vertically-reciprocating punch-carrying slide Q is arranged in the usual manner. R represents the rack by which the bed carrying the metal to be punched is moved. On the upright the mechanical movement which I have before described is arranged, as in the first illustration, the arm L being provided at its lower end with a pawl, S, which, under the vibrating movement of the arm L, will throw the pawl backward and forward, as indicated by broken lines. The two wheels are operated by a projection from the slide, so that as it rises it strikes one of the arms of the upper wheel, and as it descends it will strike the corresponding arm of the other wheel and in like manner as I have described in the first illustration, and so that the advance of the bed will be produced as the slide Q rises, and the pawl will be returned as the slide descends.

As another illustration for the use of the invention, Fig. 10 represents it as applied to an intermittent rotary feed, such as used in machines for various purposes. T T represent a pair of feed-rolls, to the arbors of which the gears with their arms are applied in the same relation to each other as before described. Then a reciprocating slide is arranged having a projection therefrom adapted to work between the arms of the respective gears, as before described, and so that at each movement of the slide U a corresponding rotary movement will be imparted to the wheels respectively. In any case one wheel is acted upon and communicates its rotation to the other, and then the second wheel is operated upon and communicates its rotation to the one wheel.

These applications of the invention will enable persons skilled in the art to apply the same mechanical movement to various purposes where it is desirable to convert a reciprocating into an intermittent rotary motion.

I claim—

The herein-described mechanism for converting reciprocating into an intermittent rotary motion, consisting of a pair of gear-wheels of equal size and teeth working together, each wheel provided with radial arms, with a reciprocating device from which a projection extends and so as to work in a path between said arms, substantially as described, and whereby the said reciprocating movement in one direction will impart rotation to one wheel, and that one wheel communicate its rotation to the other wheel, but when moving in the opposite direction the said reciprocating movement will impart rotation to the said other wheel, and the said other wheel will communicate its rotation to the first-mentioned wheel, the rotation of the wheels being in the same direction under both operations.

ALBERT W. JOHNSON.

Witnesses:
JOHN E. EARLE,
FRED C. EARLE.